United States Patent Office

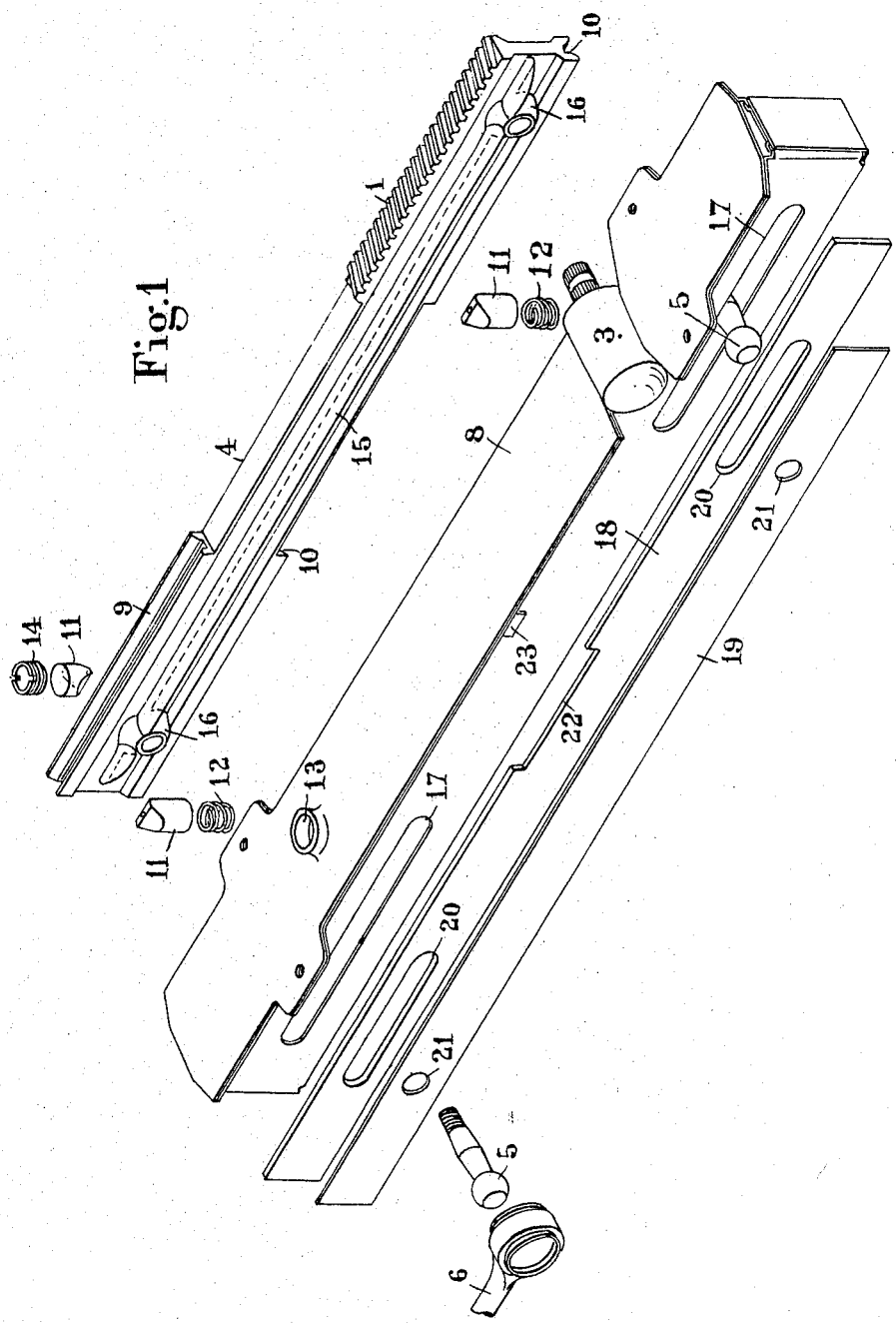

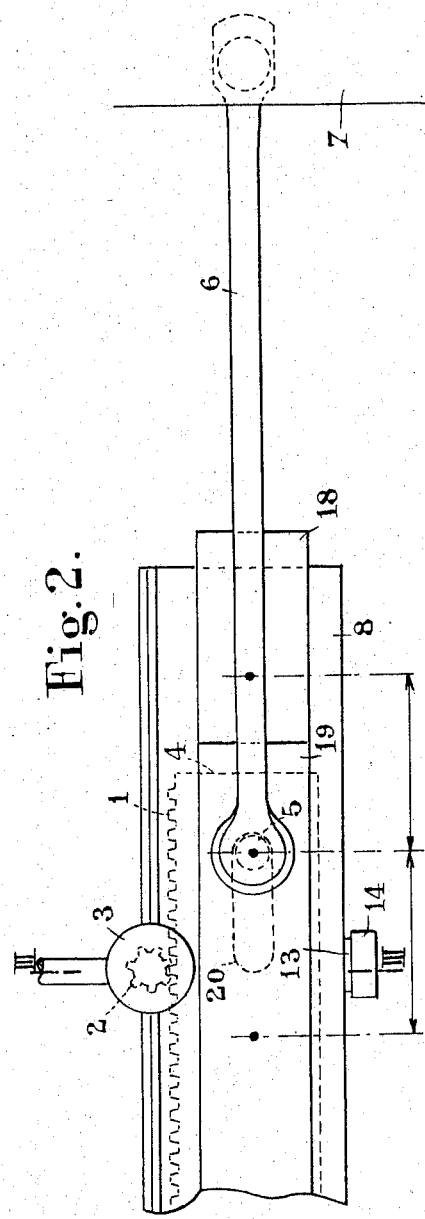
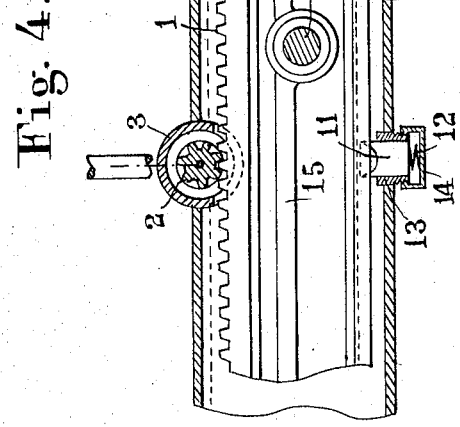
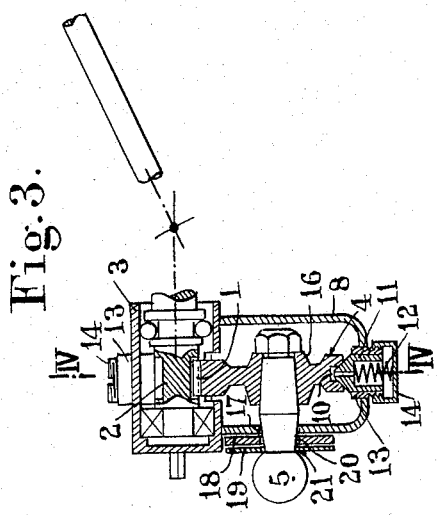

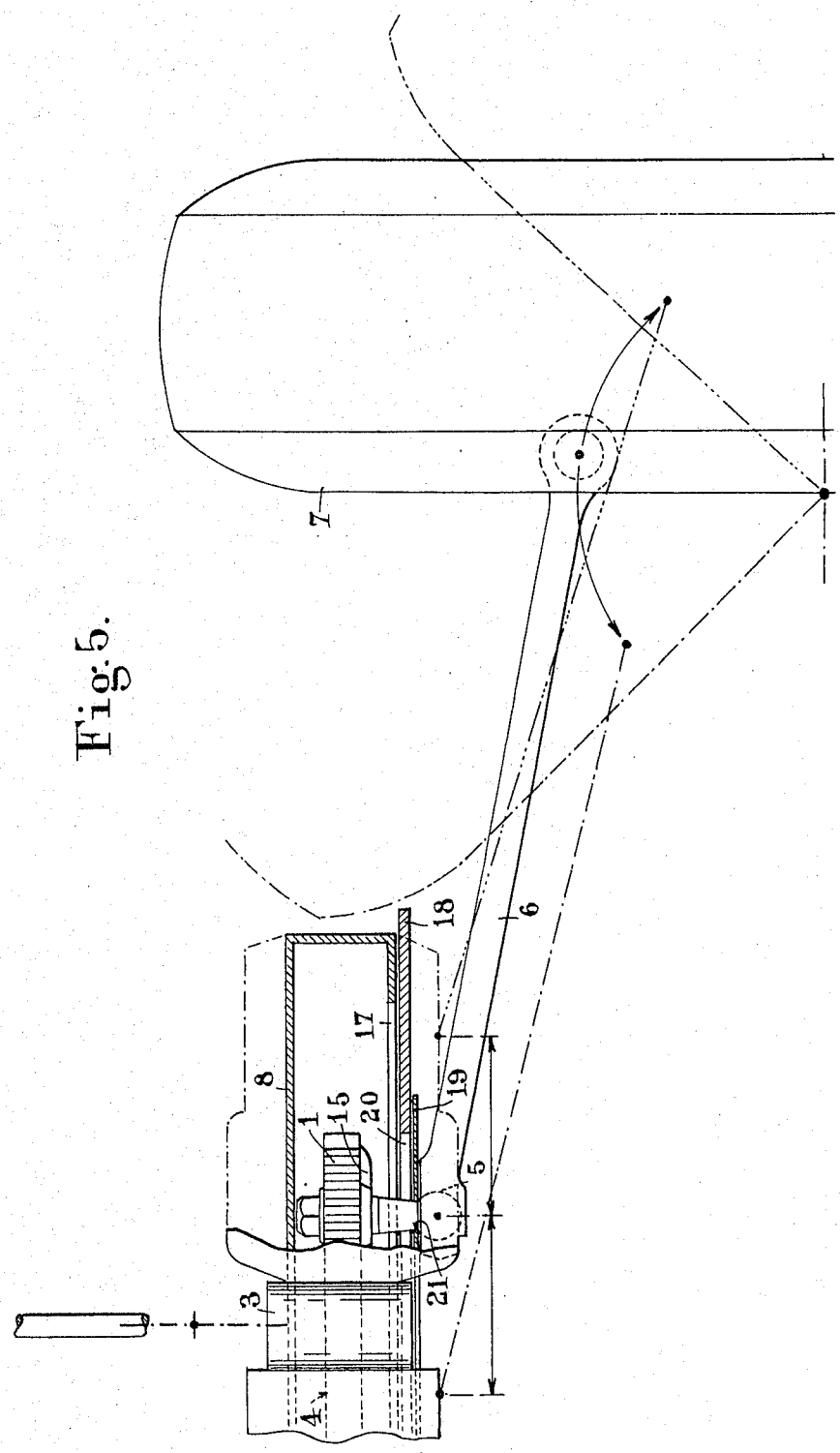

3,298,708
Patented Jan. 17, 1967

3,298,708
STEERING SYSTEMS OF AUTOMOBILE VEHICLES
Jean Cadiou, Paris, France, assignor to Societe Anonyme Andre Citroen, Paris, France
Filed Jan. 21, 1965, Ser. No. 426,781
Claims priority, application France, Jan. 23, 1964, 961,292, Patent 1,393,369
5 Claims. (Cl. 280—96)

The general construction and design of automobile vehicles demand well-defined disposals of members and, in the specific case of the steering road wheels, the preservation of the steering diagram irrespective of the wheel beat and steering angle.

It is known that the position of the steering swivel or linkage ball joints is directly connected to the geometrical design of the axle concerned; these joints move in the transverse direction to provide the steering and in many cases the path followed by this movement lies in the zone of the steering box or housing which is subordinate to the steering wheel position on the vehicle which is controlled in turn by the position of the seats.

It is known to mount said linkage ball joints on a member associated with, and responsive to the movements of translation of, the steering rack.

It is the essential object of this invention to provide a rack-and-pinion steering mechanism of this type which is characterized in that the member carrying the linkage ball joints controlling the tie-rods is mounted beneath the rack and is rigid therewith, and that the height of this carrier member is such that the ball joints are clear of the level of the steering box.

With this arrangement the linkage ball joints can be positioned near the ends of the rack housing and therefore coupled directly to the tie rods, without resorting to intermediate drag links.

In order to afford a clearer understanding of this invention and of the manner in which the same may be carried out in practice, a typical and preferred form of embodiment thereof will now be described with reference to the accompanying drawings forming part of this specification and in which:

FIGURE 1 is an exploded view of this steering control mechanism;

FIGURE 2 is a front view of the same mechanism;

FIGURE 3 is a longitudinal section taken along the line III—III of FIGURE 2;

FIGURE 4 is a cross-sectional view taken upon the line IV—IV of FIGURE 3;

FIGURE 5 is a plan view of the assembly with parts broken away.

In the drawings, the steering mechanism illustrated is of the rack-and-pinion type comprising a rack 1 adapted to be moved in its longitudinal direction by a pinion 2 rotatably mounted in a steering box 3; this rack 1 is formed along the upper portion of one end section of a member 4 supporting the linkage ball joints 5 connected to the tie rods 6 for steering the road wheels 7.

According to this invention the height of this member 4 is so selected that the linkage ball joints 5 are clear of the level of the steering box 3; due to this specific arrangement the ball joints can be displaced, according to the geometrical arrangment of the relevant axle, towards the ends or the center of the rack housing 8, since the steering box 3 cannot interfere in this case with the movements of the adjacent linkage ball joint.

The upper and lower portions of said member 4 are so machined as to provide two parallel movable slideways 9, 10 adapted to be slidably engaged by a pair of parallel members consisting of studs 11 urged by springs 12 having adequate characteristics; these studs are guided by sockets 13 rigid with the rack housing 8 and said springs 12 are retained by a screw plug 14 engaging a tapped portion of said sockets 13.

Preferably, the member 4 carrying said linkage ball joints is stiffened by adequate longitudinal ribs 15 and formed at its ends with bosses 16 for fastening the ball joints 5 thereon.

An elongated aperture 17 is formed in each end portion of the rack housing 8 to permit the passage and the movements of said linkage ball joints 5. This aperture 17 is rendered oil-tight by means of a plate 19 moving bodily with the ball-joint. However, the necessary longitudinal dimension of this plate is likely to cause it to project unduly from the housing 8 in the endmost positions of the steering mechanism and to interfere with the angular movements of the road wheels; moreover, dirt or dust would be collected by the plate 19 under these conditions. Therefore, a preferred assembly will comprise two plates 18, 19 disposed between the housing 8 and the ball-shaped heads of joints 5; these plates 18, 19 are adapted to slide on each other and along said rack housing during the movements of the linkage ball joints, the first plate 18 being formed in the vicinity of each end with an elongated aperture 20 registering with, but shorter than, the corresponding aperture 17 of housing 8, the other plate 19 having only two holes 21 to permit the passage of the neck or shank portion of the relevant ball joint 5 so as to move bodily therewith.

Means are provided for limiting the amplitude of the movements of the first plate 18 with respect to those of the other plate 19; said means consist of an elongated notch 22 formed in the middle of the upper edge of plate 18 and engageable by a projecting lug 23 rigid with the housing 8.

The length of the two sealing plates 18, 19 and the dimensions of the apertures formed in the first plate 18 and in the rack housing 8 are so selected that when the ball-joint carrier member 4 has been moved to any of its endmost positions the first plate 18 will close the apertures 17 of rack housing 8 and the other plate 19 will cover the apertures 20 of the first plate.

The relative movement produced between the first plate 18, housing 8 and second plate 19 is such that the length of the apertures 20 formed in said first plate 18 may correspond to half the length of the apertures 17 formed in said housing; under these conditions, the length of the second plate 19 will be reduced since it is only required to cover the apertures 20 of said first plate.

Of course the form of embodiment of this invention which is described hereinabove with reference to the accompanying drawings should not be construed as limiting the invention since it constitutes but a typical example of the manner in which the invention may be carried out in practice; besides, many modifications and variations may be brought to this form of embodiment without departing from the spirit and scope of the invention as set forth in the appended claims.

What I claim is:

1. A steering control system for automotive vehicles which comprises a steering wheel, a steering bar, a casing mounted transversely to the vehicle, the upper portion of said casing constituting a steering box, a rod slidably mounted in said casing, a rack formed along the upper edge of said rod, a pinion rigid with said steering bar and in constant meshing engagement with said rack in the upper portion of said casing, a pair of projecting ball joints secured at right angles to a same side of said rod and disposed symmetrically in relation to the longitudinal center line of the vehicle when said steering wheel is in the position corresponding to the straight-ahead drive, means for operatively connecting said ball joints with the steerable road wheels of the vehicle, a pair of elongated slot of same length, slightly shorter than said rack, formed in said casing across said ball joints, and sealing plates covering laterally said casing on the side of said ball joints.

2. Steering control system as set forth in claim 1, wherein said rod has formed therein at either end on its underface a guide groove, another guide groove being formed on the upper face of said rod at the end opposite to said rack, guide members housed in said casing and in constant guiding engagement with said grooves.

3. Steering control system are set forth in claim 2, wherein each guide groove has associated therewith a pin and a stud of which the operative end corresponds in shape to the cross-sectional contour of the relevant groove, spring means for constantly urging said studs into said grooves and a screw plug engaging a tapped hole formed in the corresponding lower or upper face of said casing for retaining said spring means in position.

4. Steering control system as set forth in claim 3, said sealing plates comprising a lateral plate adapted to be secured to one side of said casing, slots formed in said lateral plate and adapted to register with said slots formed in said casing, the slots of said lateral plate being somewhat shorter than those of said casing, a counter plate secured to said lateral plate, and circular holes formed in said counter plate so as to register with the slots formed in said lateral plate and casing.

5. Steering control system as set forth in claim 3, comprising a pin rigid with the control portion of the upper edge of the front face of said casing, and an elongated notch formed on either side of said pin in the upper edge of said slotted plate.

References Cited by the Examiner
FOREIGN PATENTS

| | | |
|---|---|---|
| 1,148,172 | 6/1952 | France. |
| 1,345,066 | 10/1952 | France. |
| 679,958 | 9/1952 | Great Britain. |

KENNETH H. BETTS, *Primary Examiner.*